US010343391B2

(12) United States Patent
Huang et al.

(10) Patent No.: US 10,343,391 B2
(45) Date of Patent: Jul. 9, 2019

(54) THREE-DIMENSIONAL PRINTING APPARATUS AND THREE-DIMENSIONAL PRINTING METHOD

(71) Applicants: XYZprinting, Inc., New Taipei (TW); Kinpo Electronics, Inc., New Taipei (TW)

(72) Inventors: Yao-Te Huang, New Taipei (TW); Tsung-Hua Kuo, New Taipei (TW)

(73) Assignees: XYZprinting, Inc., New Taipei (TW); Kinpo Electronics, Inc., New Taipei (TW)

( * ) Notice: Subject to any disclaimer, the term of this patent is extended or adjusted under 35 U.S.C. 154(b) by 267 days.

(21) Appl. No.: 15/458,977

(22) Filed: Mar. 15, 2017

(65) Prior Publication Data

US 2018/0207886 A1    Jul. 26, 2018

(30) Foreign Application Priority Data

Jan. 26, 2017   (CN) .......................... 2017 1 0061714

(51) Int. Cl.
| | |
|---|---|
| *B29C 67/00* | (2017.01) |
| *B33Y 50/02* | (2015.01) |
| *B33Y 10/00* | (2015.01) |
| *B33Y 30/00* | (2015.01) |
| *B29C 64/106* | (2017.01) |
| *B29C 64/393* | (2017.01) |
| *B29C 64/245* | (2017.01) |
| *B29K 105/00* | (2006.01) |

(52) U.S. Cl.
CPC .......... *B33Y 50/02* (2014.12); *B29C 64/106* (2017.08); *B29C 64/245* (2017.08); *B29C 64/393* (2017.08); *B33Y 10/00* (2014.12); *B33Y 30/00* (2014.12); *B29K 2105/0058* (2013.01)

(58) Field of Classification Search
None
See application file for complete search history.

(56) References Cited

U.S. PATENT DOCUMENTS

2016/0039148 A1\* 2/2016 Marino ................. B29C 64/386
                                                                   425/150
2016/0129633 A1\* 5/2016 Huang .................... B29C 64/20
                                                                    264/40.7

\* cited by examiner

*Primary Examiner* — Nathan T Leong
(74) *Attorney, Agent, or Firm* — JCIPRNET

(57) ABSTRACT

A 3D printing apparatus and a method thereof are provided. The apparatus includes base, forming platform, nozzle module, curing module, first sensor and second sensors and control module. The forming platform is movably disposed on the base along an axial direction. The nozzle module and the curing module are disposed on the base and located above the forming platform. The first and second sensors are movably disposed on the base and located at two opposite sides of the nozzle module and the curing module along the axial direction. A predetermined range of the 3D object on the forming platform has first and second endpoints along the axial direction, and the first and second sensors respectively correspond to the first and second endpoints. The control module determines whether the nozzle module impacts the 3D object according to a sensing time difference of the first and second sensors.

8 Claims, 7 Drawing Sheets

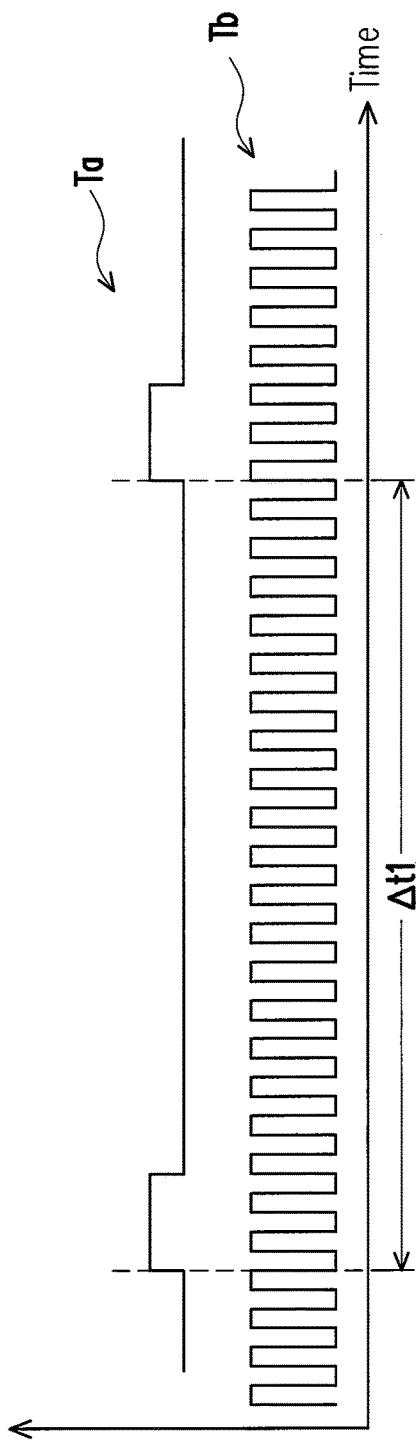
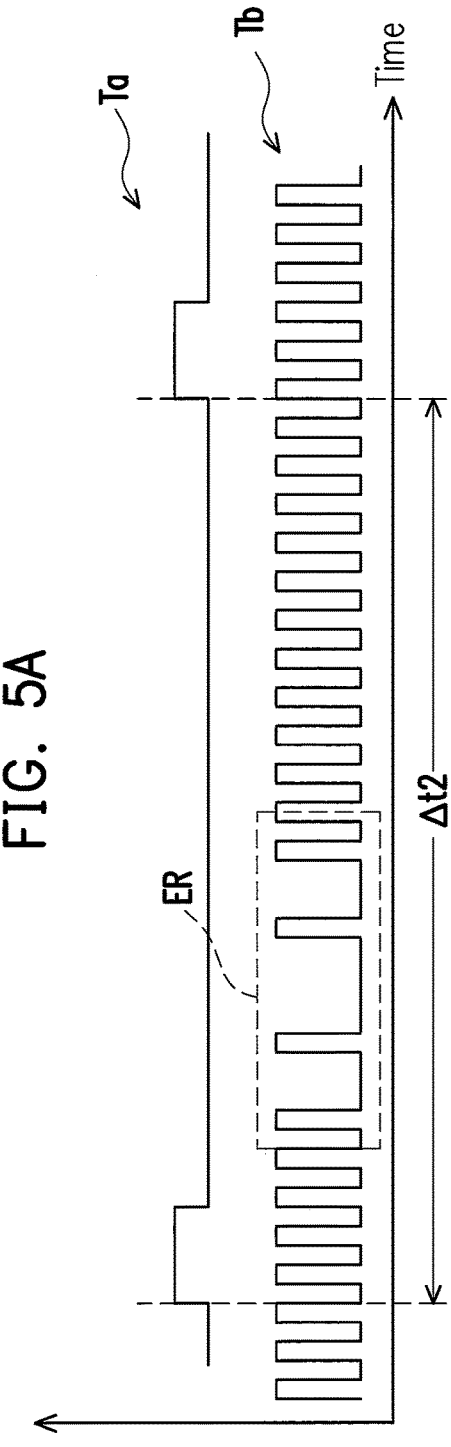
FIG. 5A
FIG. 5B

THREE-DIMENSIONAL PRINTING APPARATUS AND THREE-DIMENSIONAL PRINTING METHOD

CROSS-REFERENCE TO RELATED APPLICATION

This application claims the priority benefit of China application serial no. 201710061714.7, filed on Jan. 26, 2017. The entirety of the above-mentioned patent application is hereby incorporated by reference herein and made a part of this specification.

BACKGROUND

Technical Field

The disclosure relates to a three-dimensional (3D) printing apparatus and a 3D printing method.

Description of Related Art

Along with quick development of technology, different methods for constructing three-dimensional (3D) models by using additive manufacturing technology such as layer-by-layer model constructing, etc. have been developed. Generally, the additive manufacturing technology converts design data of a 3D model constructed by software of computer aided design (CAD), etc. into a plurality of thin (quasi two-dimensional) cross-section layers that are stacked in sequence.

Presently, methods for forming a plurality of thin cross-section layers have been developed. For example, a liquid forming material is sprayed on a moving platform according to X-Y-Z coordinates constructed based on the design data of the 3D model, and a light source is driven to move along X-Y coordinates to irradiate the liquid forming material, so as to cure the liquid forming material to form a correct cross-section layer shape. Then, as the moving platform or a spray nozzle assembly is moved along a Z-axis, the liquid forming material is cured layer-by-layer and stacked on the forming platform to form the 3D object.

SUMMARY

The disclosure is directed to a three-dimensional (3D) printing apparatus and a 3D printing method, by which whether components have an impact during a printing process is detected, and an impact warning is announced to a user.

An embodiment of the disclosure provides a 3D printing apparatus includes a base, a forming platform, a nozzle module, a first sensor, a second sensor and a control module. The forming platform and the nozzle module are respectively disposed on the base, and the forming platform and the nozzle module are adapted to move relative to each other along an axial direction, so that when the forming platform and the nozzle module pass by each other, the nozzle module prints the 3D object on the forming platform. The first sensor and the second sensor are respectively and movably disposed on the base along the axial direction and are located adjacent to the forming platform. The control module is electrically connected to the first sensor and the second sensor. A predetermined range of the 3D object on the forming platform has a first endpoint and a second endpoint along the axial direction, a position of the first sensor on the base corresponds to the first endpoint, and a position of the second sensor on the base corresponds to the second endpoint. During a printing process, the control module determines whether the nozzle module impacts a forming layer or the 3D object according to sensing signals produced by the first sensor and the second sensor for sensing the 3D object.

An embodiment of the disclosure provides a 3D printing method adapted to a 3D printing apparatus to print a 3D object. The 3D printing apparatus includes a base, a forming platform and a nozzle module, wherein the forming platform and the nozzle module are respectively disposed on the base, and the forming platform and the nozzle module are adapted to move relative to each other along an axial direction, so that when the forming platform and the nozzle module pass by each other, the nozzle module prints the 3D object on the forming platform. The 3D printing method includes: providing design data of the 3D object and converting the design data into coordinate data corresponding to the forming platform, so as to produce a predetermined range on the forming platform, where the predetermined range has a first endpoint and a second endpoint along the axial direction; providing a first sensor on the base to be located adjacent to the forming platform, driving the first sensor to move along the axial direction and positioning the first sensor to be corresponding to the first endpoint; providing a second sensor on the base to be located adjacent to the forming platform, driving the second sensor to move along the axial direction and positioning the second sensor to be corresponding to the second endpoint; and during the printing process, monitoring a sensing time difference of the first and the second sensors to determine whether the nozzle module impacts the 3D object or a forming layer of the 3D object.

According to the above description, in the 3D printing apparatus and the 3D printing method, by setting sensors beside the forming platform to indicate the endpoints of the predetermined range of the 3D object or the forming layer on the forming platform, during the printing process, it is determined whether an abnormal situation is occurred by monitoring the sensing time difference of the sensors caused by the forming layer or the 3D object on the forming platform. In other words, the user may determine that the nozzle module and the forming layer (the 3D object) are impact through prolonging of the sensing time difference, and the user is warned to avoid damaging the nozzle module or the forming layer (the 3D object).

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 5A and FIG. 5B are respectively schematic diagrams depicting other steps of FIG. 3.

DESCRIPTION OF EMBODIMENTS

Figure 1:
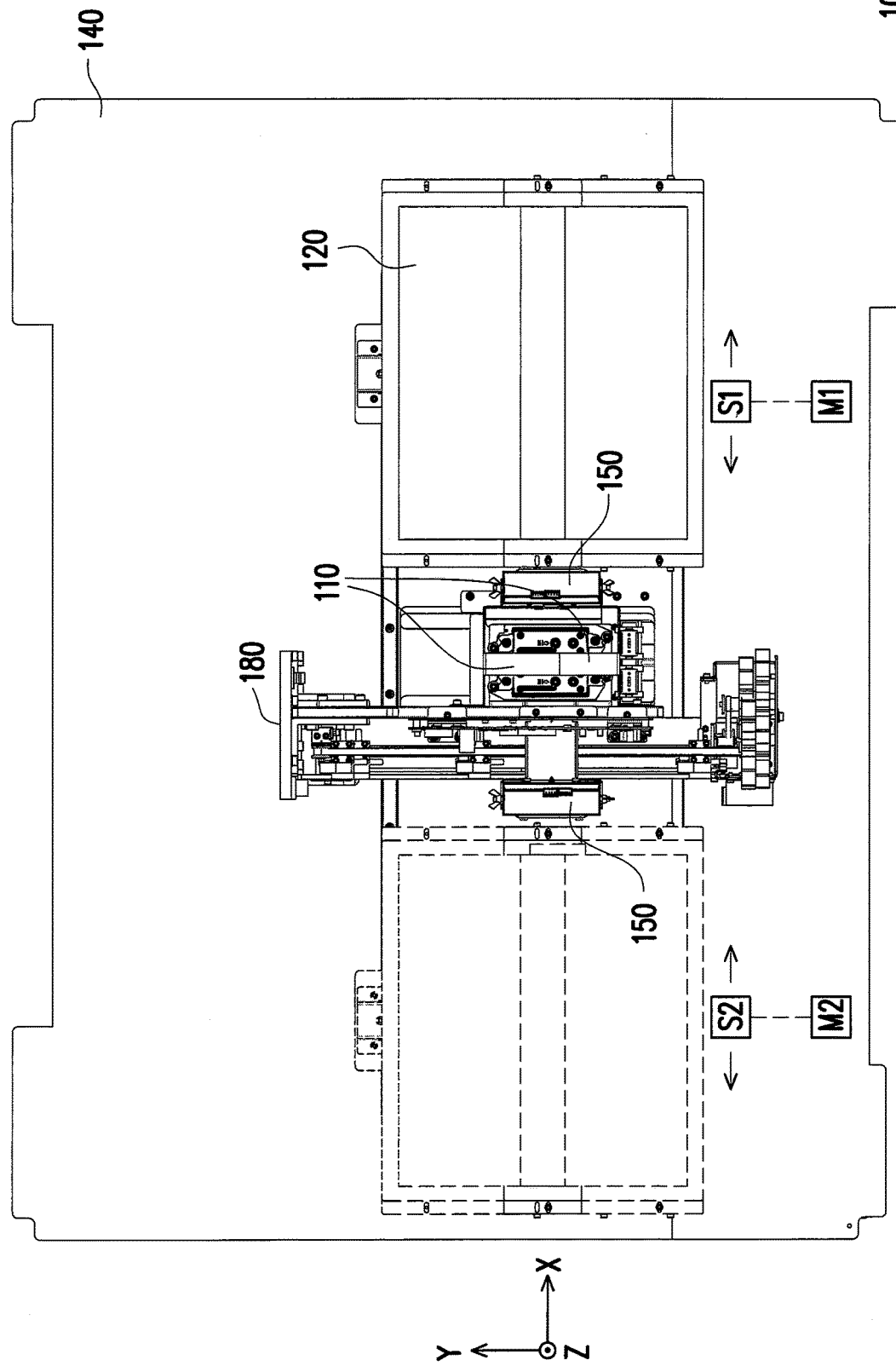
FIG. 1 is a top view of a three-dimensional (3D) printing apparatus according to an embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

Figure 2:
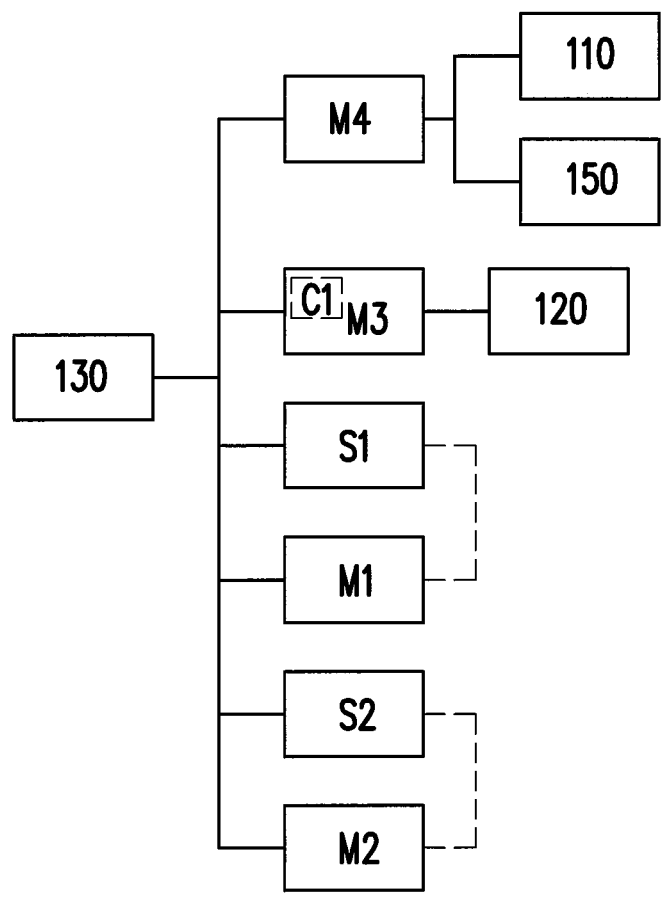
FIG. 2 is a schematic diagram illustrating a coupling relationship of partial components of the 3D printing apparatus.

FIG. 1 is a top view of a three-dimensional (3D) printing apparatus according to an embodiment of the disclosure, in which only partial related components are illustrated, and the other components can be learned according to the known technique, and details thereof are not repeated. FIG. 2 is a schematic diagram illustrating a coupling relationship of partial components of the 3D printing apparatus. Referring to FIG. 1 and FIG. 2, and Cartesian coordinates X-Y-Z are provided to facilitate describing the components. In the present embodiment, the 3D printing apparatus 100 includes a base 140, a forming platform 120, a nozzle module 110, a curing module 150 and a control module 130, where the control module 130 is electrically connected to the forming platform 120, the nozzle module 110 and the curing module 150, the forming platform 120 is movably disposed on the base 140 along an X-axis, and the nozzle module 110 and the curing module 150 are disposed on the base 140 and located on a moving path of the forming platform 120. The 3D printing apparatus 100 is, for example, a stereolithography (SL) device or a digital light processing (DLP) device, in which the control module 130 drives the nozzle module 110 to provide (spray) a liquid forming material, for example, photosensitive resin on the forming platform 120, and then the control module 130 drives the curing module 150, for example, an (ultraviolet) light curing device to irradiate the liquid forming material on the forming platform 120, such that the liquid forming material is cured (solidified) to be a forming layer, and as the forming platform 120 moves along the X-axis back and forth, the cured forming layers are stacked layer-by-layer until a 3D object is formed, so as to complete the 3D printing operation of the present embodiment. It should be noted that a moving mode of the forming platform 120 and the nozzle module 110 is not limited by the disclosure, and in another embodiment that is not illustrated, a moving mode that the forming platform 120 is fixed and the nozzle module 110 is driven can also be adopted, i.e. any moving mode adapted to move the forming platform 120 and the nozzle module 110 along the X-axis relative to each other can be adopted.

Under the existing device structure, since a situation of printing abnormity that causes impact between the nozzle module and the forming layer or the 3D object cannot be warned to the user during the printing process, the user generally learns the above situation only when the printing process is completed or the nozzle module is damaged and cannot implement the printing operation. Therefore, the 3D printing apparatus 100 of the present embodiment further includes a first sensor S1 and a second sensor S2, which are used for detecting the impact occurred during the printing process and announcing a warning message to the user.

In detail, as shown in FIG. 1, the nozzle module 110 and the curing module 150 are disposed on a gantry structure 180 of the 3D printing apparatus 100, as shown in FIG. 2, a fourth motor M4 is connected to the nozzle module 110 and/or the curing module 150 and electrically connected to the control module 130 to drive the nozzle module 110 and/or the curing module 150 to move along a Y-axis and a Z-axis, i.e. the nozzle module 110 and the curing module 150 of the present embodiment are in a fixed and non-moving state along the X-axis. Moreover, a third motor M3 is connected to the forming platform 120 and electrically connected to the control module 130, such that the control module 130 drives the forming platform 120 to move back and forth along an axial direction of the X-axis, so as to achieve a basic structure of the aforementioned 3D printing operation.

Figure 3:
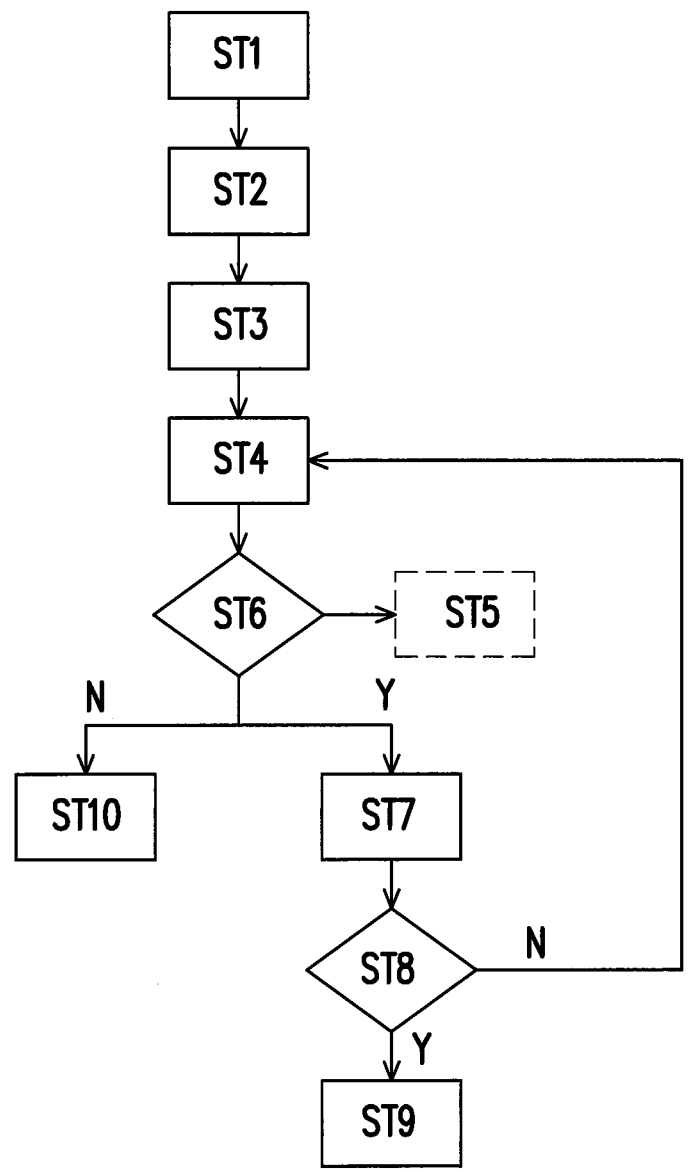
FIG. 3 is a flow chart of a 3D printing process of the disclosure.
Figure 4A:
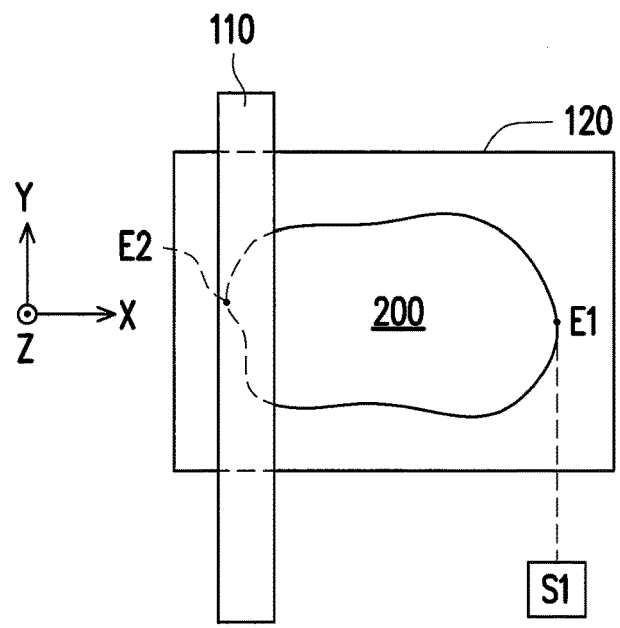
FIG. 4A and FIG. 4B are respectively schematic diagrams depicting steps of FIG. 3.
Figure 4B:
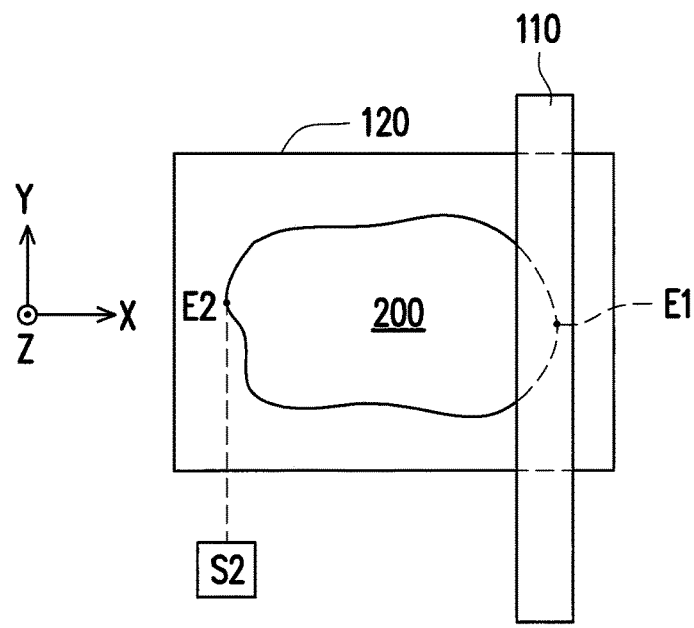

FIG. 3 is a flow chart of a 3D printing process of the disclosure. FIG. 4A and FIG. 4B are respectively schematic diagrams depicting steps of FIG. 3. FIG. 5A and FIG. 5B are respectively schematic diagrams depicting other steps of FIG. 3. Referring to FIG. 3 in comparison with FIG. 4A, FIG. 4B, FIG. 5A and FIG. 5B, in the present embodiment, in step ST1, design data of a 3D object is firstly provided, and the design data is converted into coordinate data corresponding to the forming platform 120, so as to produce a predetermined range 200 on the forming platform 120, where the predetermined range 200 has a first endpoint E1 and a second endpoint E2 on the X-axis. Comparing to FIG. 2, dot lines are adopted to describe a driving relationship between the first motor M1 and the first sensor S1 and a driving relationship between the second motor M2 and the second sensor S2. In step ST2, the first sensor S1 is provided on the base 140, and the first motor M1 drives the first sensor S1 along the X-axis, so as to locate a position of the first sensor S1 on the base 140. The aforementioned "location" refers to that the first sensor S1 may correspond to a position of the first endpoint E1 of the predetermined range 200, i.e. as shown in FIG. 4A, when the nozzle module 110 sprays the liquid forming material at the second endpoint E2, the first sensor S1 corresponds to the position of the first endpoint E1 on the X-axis. In other words, the first sensor S1 is used for defining a boundary of the predetermined range 200 of the 3D object (the forming layer) at one side of the X-axis. Then, in step ST3, the second sensor S2 is provided on the base 140, and the second motor M2 drives the second sensor S2 along the X-axis, so as to locate a position of the second sensor S2 on the base 140. The aforementioned "location" refers to that the second sensor S2 may correspond to a position of the second endpoint E2 of the predetermined range 200, i.e. as shown in FIG. 4B, when the nozzle module 110 sprays the liquid forming material at the first endpoint E1, the second sensor S2 corresponds to the position of the second endpoint E2 on the X-axis. In other words, the second sensor S2 is used for defining a boundary of the predetermined range 200 of the 3D object (the forming layer) at another side on the X-axis. In the present embodiment, the first sensor S1 and the second sensor S2 are respectively infrared sensors, and the first motor M1 and the second motor M2 are respectively stepper motors.

In this way, the first sensor S1 and the second sensor S2 can be adopted to complete boundary setting of the predetermined range 200 on the X-axis, and the control module 130 may control the third motor M3 to drive the forming platform 120 to move on the base 140, and then the printing operation of a step ST4 is started.

Then, in step ST6, the control module 130 determines whether the nozzle module 110 impacts the 3D object (or the forming layer thereof) by receiving sensing messages of the first sensor S1 and the second sensor S2. A sensing waveform Ta illustrated in FIG. 5A is a sensing waveform generated when the 3D object (or the forming layer) passes by the first sensor S1 and the second sensor S2 and is sensed by the same under a normal state. As shown in FIG. 5A, when no impact is occurred, a sensing time difference Δt1 between the first endpoint E1 and the second endpoint E2 sensed by the first sensor S1 and the second sensor S2 is a fixed value. Once the impact is occurred, it represents that the time difference between the first endpoint E1 and the second endpoint E2 of the predetermined range 200 that is sensed by the first sensor S1 and the second sensor S2 is prolonged, as shown in FIG. 5B, the time difference is prolonged to a sensing time difference Δt2 (Δt2>Δt1). Therefore, through determination of the sensing time difference of the first sensor S1 and the second sensor S2, whether the impact is occurred can be determined.

Meanwhile, the control module 130 may further execute a step ST5 to serve as an auxiliary reference to determine whether the impact is occurred. Referring to FIG. 2 and FIG. 3, in the present embodiment, the third motor M3 used for driving the forming platform 120 to move along the X-axis has an encoder C1, which serves as the control module 130 to control a moving mode of the third motor M3. In the step ST5, the control module 130 also monitors waveform data of the encoder C1, referring to FIG. 5A and FIG. 5B, the sensing waveform Tb shown in FIG. 5A is in the normal state, which represents that a moving process of the forming platform 120 has no obstacle, and in FIG. 5B, the sensing waveform Tb obviously has an abnormal waveform ER within a predetermined time, which represents that the third motor M3 has abnormity during the process of driving the forming platform 120, so that the control module 130 may accordingly determine whether the impact is occurred.

In general, in step ST6, the control module 130 may determine whether the nozzle module 110 impacts the 3D object (or the forming layer) according to the sensing time difference between the first sensor S1 and the second sensor S2 and whether the encoder C1 of the third motor M3 has an abnormal waveform in the step ST5.

Then, in step ST7, after the impact is occurred, the control module 130 sends a visual and/or audio warning message to the user through a warning system (not shown), and in step ST8, the user makes further confirmation. When it is confirmed that the impact is occurred, in step ST9, the current printing operation is stopped to facilitate implementing troubleshooting. If it is confirmed that the impact is not occurred, the printing operation of the aforementioned step ST4 is continued.

Moreover, if the control module 130 determines that the impact is not occurred, the printing operation of the step ST4 is continued until a step ST10 to complete printing the 3D object.

It should be noted that the predetermined range 200 shown in FIG. 4A and FIG. 4B is only an orthogonal projection profile of one of the forming layers on the forming platform 120, and along with continuous stacking of the forming layers, different profiles and forming layers of different ranges are presented, and values of the coordinates of the first endpoint and the second endpoint on the X-axis are accordingly changed, and the positions of the first sensor S1 and the second sensor S2 are certainly adjusted accordingly.

Moreover, determination frequency of the step ST6 can be properly set according to a printing environment. For example, the user may set that the determination is performed for each of the forming layers, or one detection or determination is performed every a fixed layer number of the forming layers or a fixed thickness of the forming layers.

Figure 6:
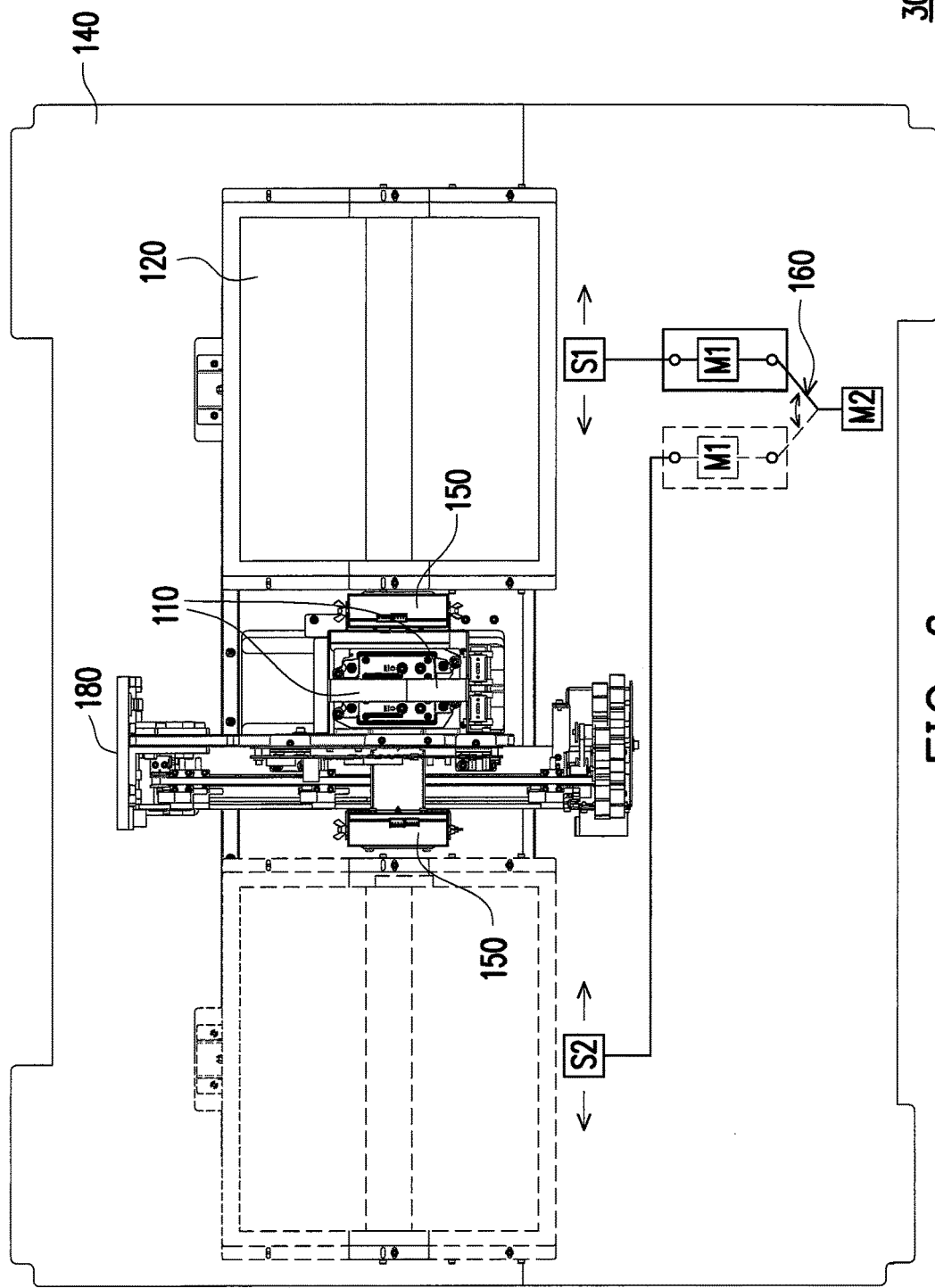
FIG. 6 is a top view of a 3D printing apparatus according to another embodiment of the disclosure.
Figure 7:
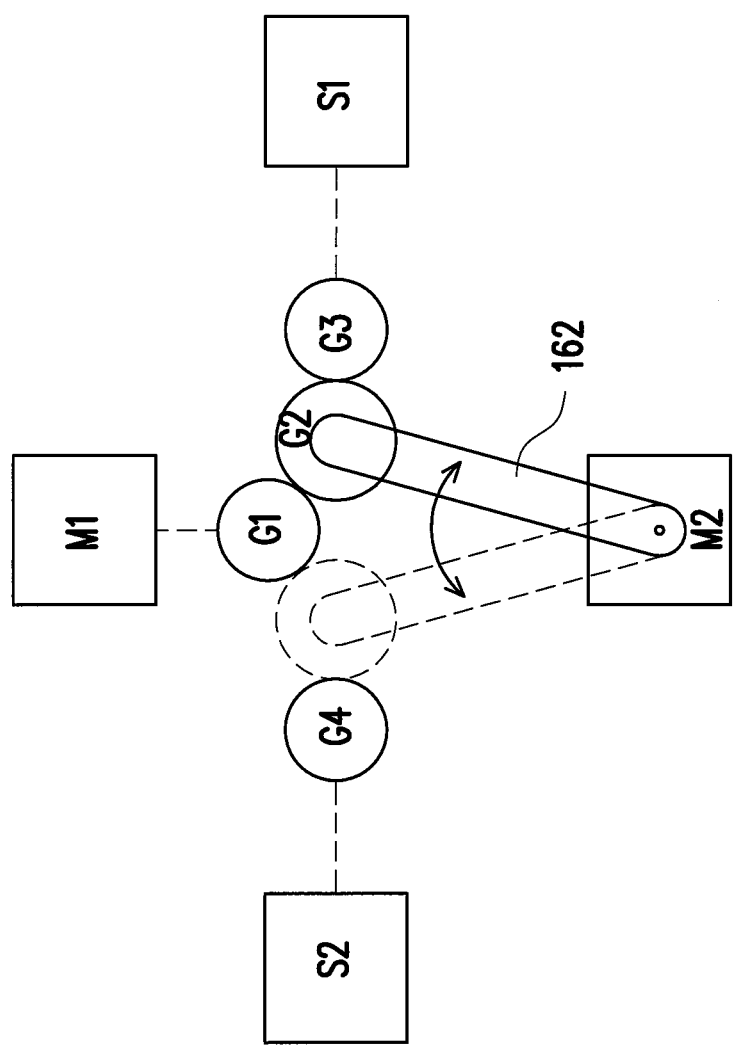
FIG. 7 is a schematic diagram of partial components of the 3D printing apparatus of FIG. 6.

FIG. 6 is a top view of a 3D printing apparatus according to another embodiment of the disclosure. FIG. 7 is a schematic diagram of partial components of the 3D printing apparatus of FIG. 6. It should be noted that in FIG. 7, related structure is illustrated in a single viewing angle, and a transmission manner thereof is simply illustrated, and technical features of the present embodiment are not limited thereto. Referring to FIG. 6 and FIG. 7, in the present embodiment, the same to the aforementioned embodiment, the 3D printing apparatus 300 includes the base 140, the nozzle module 110, the curing module 150 (including a fourth motor M4 driving the curing module 150), the gantry structure 180, the forming platform 120 (including the third motor M3 driving the forming platform 120), and the first sensor S1 and the second sensor S2, and a difference there between lies in the method of driving the first sensor S1 and the second sensor S2. The 3D printing apparatus 300 further includes a transmission assembly and a switching assembly, where the transmission assembly includes a first motor M1 and a gear set G1, and the switching assembly includes a second motor M2, a swing arm 162 and a gear set G2, which is used for connecting between the first motor M1 and the first sensor S1 or between the first motor M1 and the second sensor S2, so as to switch between a first state and a second state.

Further, when the switching assembly is in the first state, as shown by the swing arm 162 in solid lines and the gear set G2 of FIG. 7, the second motor M2 drives the swing arm 162 and the gear set G2 thereon for coupling between the gear set G1 and the gear set G3, such that the power of the first motor M1 is transmitted to drive the first sensor S1. Comparatively, when the switching assembly is in the second state, as shown by the swing arm 162 in dot lines and the gear set G2 of FIG. 7, the second motor M2 drives the swing arm 162 and the gear set G2 thereon for coupling between the gear set G1 and the gear set G4, such that the power of the first motor M1 is transmitted to the gear set G4 through the gear set G1 and the gear set G2, so as to drive the second sensor S2. The first motor M1 is a stepper motor, the second motor M2 is a direct current (DC) motor, based on the characteristic that the second motor M2 is only required to provide a switching operation without achieving a precise positioning, convenience of the user for selecting the motors is improved, so as to effectively decrease the component cost.

In summary, in the 3D printing apparatus and the 3D printing method, by setting sensors beside the forming platform to indicate the endpoints of the predetermined range of the 3D object or the forming layer on the forming platform, during the printing process, it is determined whether an abnormal situation is occurred by monitoring the sensing time difference of the sensors caused by the forming layer or the 3D object on the forming platform. Meanwhile, it is monitored whether the waveform of the encoder of the motor used for driving the forming platform is abnormal, which can be used as a reference in collaboration with the aforementioned sensing time difference to determine whether the impact is produced, such that the user can be opportunely warned when the impact is produced, so as to facilitate implementing troubleshooting to avoid component damage. Moreover, besides that the one-to-one manner can be adopted to use the first motor and the second motor to respectively drive the first sensor and the second sensor, the switching assembly can also be adopted to switch the transmission assembly used for driving the sensors, so as to improve convenience of the user for selecting motors, and effectively decrease the component cost.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A three-dimensional (3D) printing apparatus, adapted to print a 3D object, comprising:
    a base;
    a forming platform and a nozzle module, respectively disposed on the base, and the forming platform and the nozzle module being adapted to move relative to each other along an axial direction, wherein the nozzle module prints the 3D object on the forming platform when the forming platform and the nozzle module pass by each other;
    a first sensor and a second sensor, respectively and movably disposed on the base along the axial direction and located adjacent to the forming platform; and
    a control module, electrically connected to the first sensor and the second sensor, wherein a predetermined range of the 3D object on the forming platform has a first endpoint and a second endpoint along the axial direction, a position of the first sensor on the base corresponds to the first endpoint, and a position of the second sensor on the base corresponds to the second endpoint, and during a printing process, the control module determines whether the nozzle module impacts the 3D object according to sensing signals produced by the first sensor and the second sensor for sensing the 3D object.

2. The 3D printing apparatus as claimed in claim 1, further comprising:
    a first motor, structurally connected to the first sensor and electrically connected to the control module, so as to drive the first sensor to move along the axial direction; and
    a second motor, structurally connected to the second sensor and electrically connected to the control module, so as to drive the second sensor to move along the axial direction, wherein the position of the first sensor on the base is a position of the first sensor corresponding to the first endpoint on the axial direction when the nozzle module prints the 3D object at the second endpoint, and the position of the second sensor on the base is a position of the second sensor corresponding to the second endpoint on the axial direction when the nozzle module prints the 3D object at the first endpoint.

3. The 3D printing apparatus as claimed in claim 2, wherein the first motor and the second motor are respectively stepper motors.

4. The 3D printing apparatus as claimed in claim 1, further comprising:
    a third motor, electrically connected to the control module and structurally connected to the forming platform or the nozzle module, so as to drive the forming platform or the nozzle module to move along the axial direction.

5. The 3D printing apparatus as claimed in claim 4, wherein the third motor has an encoder, and the control module determines whether the nozzle module impacts the 3D object according to a waveform generated by the encoder.

6. The 3D printing apparatus as claimed in claim 1, wherein the first sensor and the second sensor are respectively infrared sensors.

7. The 3D printing apparatus as claimed in claim 1, further comprising:
    a first motor, electrically connected to the control module;
    a transmission assembly, connected between the first motor and the first sensor, or connected between the first motor and the second sensor;
    a second motor, electrically connected to the control module;
    a switching assembly, connected to the second motor and driven to switch transmission paths of the transmission assembly, wherein the second motor drives the transmission assembly to move the first sensor through the switching assembly, or the second motor drives the transmission assembly to move the second sensor through the switching assembly.

8. The 3D printing apparatus as claimed in claim 7, wherein the first motor is a stepper motor, and the second motor is a direct current motor.

* * * * *